United States Patent [19]

Inukai et al.

[11] Patent Number: 5,149,753
[45] Date of Patent: Sep. 22, 1992

[54] FLUORINE-CONTAINING COPOLYMER AND PROCESS FOR PREPARING THE SAME

[75] Inventors: Hiroshi Inukai, Settsu; Takahiro Kitahara, Suita, both of Japan

[73] Assignee: Daikin Industries, Ltd., Japan

[21] Appl. No.: 579,089

[22] Filed: Oct. 4, 1990

Related U.S. Application Data

[63] Continuation of Ser. No. 316,956, Feb. 28, 1989, abandoned.

[30] Foreign Application Priority Data

Mar. 1, 1988 [JP] Japan .................................. 63-48459

[51] Int. Cl.$^5$ .............................................. C08F 18/20
[52] U.S. Cl. ..................................... 526/245; 385/123
[58] Field of Search .......................................... 526/245

[56] References Cited

U.S. PATENT DOCUMENTS

| | | | |
|---|---|---|---|
| 3,282,905 | 11/1966 | Fasick et al. | 526/245 |
| 3,491,169 | 1/1970 | Raynolds et al. | 526/245 |
| 4,365,049 | 12/1982 | Tsunoda et al. | 526/245 |
| 4,544,235 | 10/1985 | Nishida et al. | 526/245 |
| 4,720,166 | 1/1988 | Ohmori et al. | 526/245 |

FOREIGN PATENT DOCUMENTS

| | | |
|---|---|---|
| 0103761 | 3/1984 | European Pat. Off. . |
| 0243605 | 11/1987 | European Pat. Off. . |
| 0364587 | 4/1990 | European Pat. Off. . |
| 0105010 | 6/1984 | Japan . |
| 0152909 | 8/1984 | Japan . |

OTHER PUBLICATIONS

Official Gazette 1046 TMOG 2, Sep. 4, 1984.
Chemical Abstracts, vol. 109, No. 18, 1988, p. 16, Abstract No. 150270w.
Patent Abstracts of Japan, vol. 010, No. 230 (C-365) [2286], Aug. 9, 1986.

Primary Examiner—Joseph L. Schofer
Assistant Examiner—N. Sarofim
Attorney, Agent, or Firm—Larson and Taylor

[57] ABSTRACT

The invention provides: a fluorine-containing copolymer comprising methyl methacrylate and at least one long-chain fluoroalkyl methacrylate and having a light transmittance of about 90% or more; a method of preparing the copolymer; and an optical fiber using the copolymer as the cladding material.

5 Claims, No Drawings

FLUORINE-CONTAINING COPOLYMER AND PROCESS FOR PREPARING THE SAME

This application is a continuation of application Ser. No. 07/316,956 filed Feb. 28, 1989, now abandoned.

FIELD OF THE INVENTION

The present invention relates to fluorine-containing copolymers, and more particularly to fluorine-containing copolymers suitable for use as materials for producing claddings for plastics optical fibers.

BACKGROUND OF THE INVENTION

It is known to use, as a material for producing claddings for optical fibers, a polymer or a copolymer comprising fluoroalkyl methacrylate represented by the formula

wherein X is hydrogen atom, fluorine atom or chlorine atom, m is an integer of 1 to 6 and n is an integer of 2 to 10 (e.g. Japanese Examined Patent Publication No.8978/1968)

However, a significantly turbid copolymer is formed by bulk copolymerization of said monomer and methyl methacrylate (MMA). The turbidity of the copolymer is caused presumably because the fluoroalkyl methacrylate having a long molecular chain becomes difficult to diffuse at the latter stage of polymerization.

In preparation of fluorine-containing polymers useful as materials for forming claddings for optical fibers, bulk or mass polymerization is preferably conducted because this method eliminates the need of a suspension stabilizer as used in suspension polymerization and an emulsifying agent as used in emulsion polymerization, and can avoid the possibility of contaminant being introduced during the purification of the polymer.

To inhibit the turbidity, a bulk polymerization method has been proposed for forming a terpolymer (e.g., in Japanese Unexamined Patent Publication No.66706/1986) which comprises:

(1) 30 to 60% by weight of a comonomer represented by the formula

(2) 20 to 50% by weight of a comonomer represented by the formula

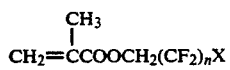

wherein X is hydrogen atom or fluorine atom, and n is an integer of 1 to 4, and (3) 20 to 50% by weight of MMA.

The proposed method, however, is limitative in giving a terpolymer comprising the combination of three comonomers (1) to (3). Further the method gives a turbid terpolymer when using 20% by weight or more of the comonomer (3) and 20% by weight or less of the comonomer (2). Moreover, the method is ineffective in forming a copolymer comprising long-chain fluoroalkyl methacrylate and MMA, or a terpolymer comprising said comonomers and methacrylate having branched fluoroalkyl group. In this case, a turbid polymer is produced by the method.

SUMMARY OF THE INVENTION

It is an object of this invention to provide a fluorine-containing copolymer or terpolymer having good transparency and a process for preparing the same.

The present invention provides a fluorine-containing copolymer comprising methyl methacrylate and at least one long-chain fluoroalkyl methacrylate and having a light transmittance of about 90% or more.

DETAILED DESCRIPTION OF THE INVENTION

Preferred fluorine-containing copolymers according to the present invention include, for example, (A) a copolymer having a light transmittance of 90% or more and comprising:

(a) about 50 to about 95% by weight of fluoroalkyl methacrylate represented by the formula

wherein n is an integer of 6 to 10, and (b) about 5 to about 50% by weight of methyl methacrylate; and (B) a terpolymer or a quadripolymer having a light transmittance of 90% or more and comprising:

(a) about 50 to about 95% by weight of fluoroalkyl methacrylate represented by the formula

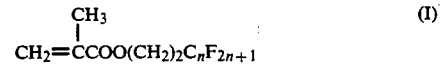

wherein n is an integer of 6 to 10, (b) about 5 to about 50% by weight of methyl methacrylate, and (c) 0 to about 40% by weight of at least one of fluoroalkyl methacrylate represented by the formula

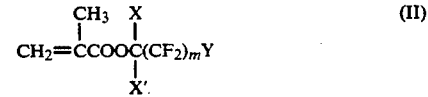

wherein X and X' each independently represent hydrogen atom, methyl group or ethyl group, Y is hydrogen atom or fluorine atom and m is an integer of 4 to 10, and fluoroalkyl methacrylate represented by the formula

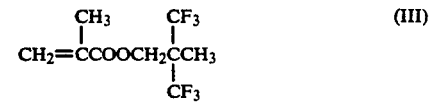

Preferable examples of the fluoroalkyl methacrylates represented by the formula (I) are those wherein n is 6, 7 or 8.

Preferable examples of the fluoroalkyl methacrylates represented by the formula (II) are those wherein X, X' and Y are hydrogen and m is 4, 6, 8 or 10, and those wherein X and X' are methyl group and Y is hydrogen and m is 4, 6, 8 or 10.

The term "light transmittance" used herein denotes the percent intensity of transmitted light based on the intensity of incident light (T %) of a sheet determined at a wavelength of about 450 to about 88 nm by a ultraviolet visible spectrometer, said sheet being 2 mm in thickness formed by press molding a fluorine-containing copolymer at 180° C. to 250° C.

The fluorine-containing copolymer of the invention has a light transmittance of about 90% or more, preferably about 95% or more.

The fluorine-containing copolymer of the invention usually has a flow rate of about 10 to about 400 g/10 minutes as determined by using Koka type flow tester (Shimadzu Seisakusho Ltd., Japan) which pushes the polymer out of a nozzle (2 mm in diameter and 8 mm in length) at a load of 7 kg/cm$^2$ after having kept the polymer at 230° C. for 5 minutes.

In copolymerizing methyl methacrylate and at least one long-chain fluoroalkyl methacrylate according to the invention, a solvent in which the resulting copolymer can be dissolved is used in an amount of about 0.1 to about 20 parts by weight per 100 parts by weight of the total monomers.

Our research has revealed that the solvent capable of dissolving the copolymer serves as a turbidity inhibitor when used in an amount of about 1 to about 20 parts by weight per 100 parts by weight of the total monomers. The present invention has been accomplished on the basis of this novel finding.

The term "long-chain fluoroalkyl methacrylate" used herein refers to one which contains fluoroalkyl group having 6 or more carbon atoms such as fluoroalkyl methacrylate represented by the formula

$$CH_2=\overset{CH_3}{\underset{|}{C}}COO(CH_2)_2C_nF_{2n+1}$$

wherein n is an integer of 6 to 10.

Examples of solvents useful in the invention are ketones such as acetone, methyl ethyl ketone, methyl isobutyl ketone and the like, acetates such as ethyl acetate, butyl acetate and the like, fluorine-type solvents such as metaxylene hexafluoride, 1,1,2-trifluoro-1,2,2-trichloroethane and the like and chlorine-type solvents such as 1,1,1,-trichloroethane, 1,2-dichloroethane and the like. These solvents may be used singly or in a mixture of at least two kinds. Preferred solvents are those having a boiling point of about 50° C. to about 150° C. among which metaxylene hexafluoride is more preferred.

The amount of solvent of less than about 0.1 part by weight per 100 parts by weight of the total monomers results in formation of a turbid polymer. On the other hand, if more than about 20 parts by weight of the solvent is used, the molecular weight is markedly reduced and the polymerization rate is lowered as in solution polymerization. Furthermore, excess use of the solvent necessitates reprecipitation to separate the copolymer from the solvent and requires removal of increased amount of solvent, resulting in higher production costs and in necessity of cumbersome procedure. A preferred amount of the solvent is about 1 to about 15 parts by weight per 100 parts by weight of the total monomers.

Usable as a polymerization initiator are usual radical polymerization initiators such as azobisisobutyronitrile, benzoylperoxide or the like.

Polymerization methods which can be performed in this invention include continuous bulk polymerization, batchwise bulk polymerization, casting bulk polymerization and like usual methods. The polymerization is carried out at a temperature in the range of room temperature to about 100° C., preferably about 50° C. to about 80° C.

It is possible in this invention to use an agent for controlling the polymerization degree such as dodecyl mercaptan or the like.

Upon completion of polymerization, the polymer is heated to a temperature of about 150° C. to about 200° C. under reduced pressure of 100 mmHg or lower to distill off the solvent (turbidity inhibitor) and the monomer residue.

The thus obtained copolymer has high transparency and exhibits outstanding light transmitting property when used as a material for producing claddings for optical fibers.

In preparing optical fibers, the cladding material of the invention is used in combination with a core material which is usually higher by at least 3% in refractive index than the cladding. Core materials to be surrounded by the cladding material of the invention are not limited and include polymethyl methacrylate, polystylene, polycarbonate, polyester, etc.

The optical fiber comprising the combination of the cladding material of the invention and such core material exhibits improved properties such as greatly reduced optical transmission loss, etc.

EXAMPLES

The present invention will be described below in greater detail with respect to the following Examples and Comparison Examples.

EXAMPLE 1

A 75 part quantity of a monomer of the formula

$$CH_2=\overset{CH_3}{\underset{|}{C}}COOCH_2CH_2(CF_2)_7CF_3$$

(hereafter referred to as 17 FMA) as purified by distillation under reduced pressure, 25 parts of methyl methacrylate, 0.04 part of n-lauryl mercaptan, 0.025 part of azobisisobutyronitrile and 11 parts of metaxylene hexafluoride were mixed together in the absence of oxygen. Copolymerization was conducted for 18 hours in a reactor containing the mixture and maintained at 70° C. The resulting copolymer was dried under reduced pressure at 170° C. for 10 hours, giving 98 g of a copolymer in a yield of 98%. The flow rate of the copolymer was 100 g/10 min (230° C., load of 7 kg/cm$^2$). The copolymer was pressed at 230° C. to form a sheet of 2 mm thickness. Visual inspection shows that the sheet was colorless and transparent and had a light transmittance of 95%.

EXAMPLE 2

A 60 part quantity of 17 FMA as purified by distillation under reduced pressure, 20 parts of methyl methacrylate, 20 parts of hexafluoroneopentyl methacrylate, 0.03 part of n-lauryl mercaptan, 0.025 part of azobisisobutyronitrile and 11 parts of metaxylene hexafluoride were mixed together in the absence of oxygen. Copolymerization was conducted in a similar manner as in Example 1, giving 98 g of a copolymer in a yield of 98%. The flow rate of the copolymer was 90 g/10 min (230° C., load of 7 kg/cm$^2$). The copolymer was pressed at 230° C. to form a sheet of 2 mm thickness. Visual inspection shows that the sheet wa colorless and transparent and had a light transmittance of 95%.

EXAMPLE 3

65 part quantity of 17FMA as purified by distillation under reduced pressure, 20 parts of methyl methacrylate, 15 parts of

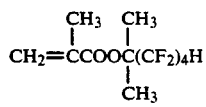

0.025 part of n-lauryl mercaptan, 0.025 part of azobisisobutylonitrile and 11 parts of metaxylene hexafluoride were mixed together in the absence of oxygen. Copolymerization was carried out in the similar manner as in Example 1 to produce 98 g of a copolymer in a yield of 98%. The flow rate of the copolymer was 105 g/10 min (230° C., load of 7 kg/cm$^2$).

A sheet prepared in the same manner as in Example 1 was colorless and transparent and had a light transmittance of 95%.

EXAMPLE 4

A copolymer (97 g, yield=97%) was produced in a similar manner as in Example 3 with the exception of using parts of

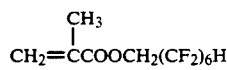

in place of 15 parts of

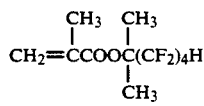

The flow rate of the copolymer was 103 g/10 min (230° C., load of 7 kg/cm$^2$).

A sheet formed in the same manner as in Example 3 had a light transmittance of 95%.

COMPARISON EXAMPLE 1

A copolymer was produced by carrying out the same procedure as in Example 1 with the exception of not using metaxylene hexafluoride. The copolymer was pressed at 230° C. to form a sheet of 2 mm thickness. Visual inspection shows that the sheet was turbid and had a light transmittance of 85%.

COMPARISON EXAMPLE 2

A copolymer was produced by carrying out the same procedure as in Example 2 with the exception of not using metaxylene hexafluoride. The copolymer was pressed at 230° C. to form a sheet of 2 mm thickness. Visual inspection shows that the sheet was turbid and had a light transmittance of 85%.

EXAMPLE 5

With use of the polymer of Example 1 (refractive index=1.398) as the cladding material and polymethyl- methacrylate (1 mm in diameter) as the core material, a cladded fiber was conjugate spun at 250° C. and then stretched to 1.7 times the original length to give an optical fiber of 700 μm in diameter.

The optical transmission loss measured with use of an LED light source at a wave length of 650 nm was 180 dB/km.

COMPARISON EXAMPLE 3

An optical fiber was prepared in a similar manner as in Example 5 with the exception of using the copolymer obtained in Comparison Example 1 as the cladding material.

The optical transmission loss measured in the same manner as in Example 5 was 1000 dB/km.

We claim:

1. A fluorine-containing copolymer having a light transmittance of 90% or more and consisting essentially of
   (a) about 50 to about 95% by weight of fluoroalkyl methacrylate represented by the formula

wherein n is an integer of 6 to 10, and
   (b) about 5 to about 50% by weight of methyl methacrylate.

2. A fluorine-containing copolymer having a light transmittance of 90% or more and consisting essentially of
   (a) about 50 to about 95% by weight of fluoroalkyl methacrylate represented by the formula

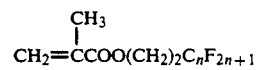

wherein n is an integer of 6 to 10,
   (b) about 5 to about 50% by weight of methyl methacrylate, and
   (c) 0 to about 40% by weight of at least one of fluoroalkyl methacrylate represented by the formula

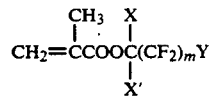

wherein X and X' each independently represent hydrogen atom, methyl group or ethyl group, Y is hydrogen atom or fluorine atom and m is an integer of 4 to 10, and fluoroalkyl methacrylate represented by the formula

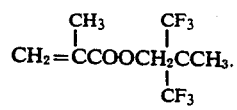

3. A material for forming a cladding for optical fibers which material is the fluorine-containing copolymer as defined in claim 1.

4. A material for forming a cladding for optical fibers which material is the fluorine-containing copolymer as defined in claim 1.

5. A material for forming a cladding for optical fibers which material is the fluorine-containing copolymer as defined in claim 2.

* * * * *